United States Patent [19]

Maxwell et al.

[11] Patent Number: 5,549,131
[45] Date of Patent: Aug. 27, 1996

[54] AUTOMATIC RECIRCULATION VALVE

[75] Inventors: Horace J. Maxwell, Langhorne; Ronald J. Sirchio, Lafayette Hill; James J. Henofer, Norristown, all of Pa.

[73] Assignee: Keystone International Holdings Corp., Wilmington, Del.

[21] Appl. No.: 376,753

[22] Filed: Jan. 23, 1995

[51] Int. Cl.⁶ .................................... F16K 17/00
[52] U.S. Cl. ................. 137/115.18; 137/115.03; 251/126
[58] Field of Search ............... 137/115, 116 I, 137/117; 251/126

[56] References Cited

U.S. PATENT DOCUMENTS

| | | |
|---|---|---|
| 60,378 | 12/1866 | Hunt . |
| 1,555,851 | 10/1925 | Van Emon . |
| 4,244,388 | 1/1981 | Feiss . |
| 4,779,639 | 10/1988 | Loss et al. . |
| 4,941,502 | 7/1990 | Loos et al. . |
| 4,967,783 | 11/1990 | Loos . |
| 5,172,716 | 12/1992 | Paptzün .................................. 137/117 |
| 5,333,638 | 8/1994 | Maxwell ................................. 137/116 |

FOREIGN PATENT DOCUMENTS

| | | | |
|---|---|---|---|
| 705695 | 5/1941 | Germany .............................. 137/117 |
| 1453783 | 4/1969 | Germany .............................. 137/117 |

*Primary Examiner*—Stephen M. Hepperle
*Attorney, Agent, or Firm*—Synnestvedt & Lechner

[57] ABSTRACT

An automatic recirculation valve having a body portion, a central hub integral with said body portion and inlet, main outlet and recirculation outlets. A main valve element responsive to flow from said inlet to said main outlet includes a hollow stem forming a bypass valve member through which recirculation fluid flows. A shaft guide bushing surrounding the valve stem and bypass adapter in the bypass outlet provides a recirculation fluid passage and imparts a swirling movement to the recirculation fluid exiting the recirculation outlet to protect the valve body and downstream piping from damage.

6 Claims, 1 Drawing Sheet

AUTOMATIC RECIRCULATION VALVE

The present invention relates to automatic recirculation valves and, more particularly, to recirculation valves directed to regulating the bypass recirculation flow in centrifugal pump systems.

Recirculation valves are frequently used in centrifugal pump applications to prevent pump overheating and maintain hydraulic stability. Pump overheating results from the transfer of heat energy created by the pump to the fluid flowing therethrough. During normal operating conditions (normal downstream demand for the pumped fluid) in a properly designed system, there is sufficient flow through the pump to absorb and carry away the transferred heat and thereby prevent overheating. During periods of low flow demand, however, the slower moving or even stagnant fluid absorbs a much greater amount of heat during its residence time in the pump, causing a substantial increase in the temperature of the fluid therein. As the temperature of the fluid within the pump increases, its vapor pressure increases, leading to cavitation which can damage the pump impeller and housing.

Low flow conditions can also result in a phenomenon classically known as internal recirculation. Under low flow conditions, hydraulic anomalies can occur within the pump. These anomalies are fluid responses to the less than optimum internal geometry of the pump at low flow rates and are generally initiated in the region where the fluid discharges the impeller near the pump housing discharge. This phenomenon, known as internal recirculation, results in cavitation which can damage the pump impeller.

Recirculation valves prevent pump overheating and maintain hydraulic stability by providing a secondary path through which the pump can maintain a sufficient fluid flow during periods of low downstream flow demand. One commonly used type of recirculation valve is a modulating flow valve as disclosed in U.S. Pat. No. 4,095,611, U.S. Pat. No. 4,941,502 and U.S. Pat. No. 5,333,638. These patents disclose valves having an inlet, a main outlet, a recirculation outlet, a main flow element, and a bypass element with slotted orifices. Such valves are located downstream of the pump. Fluid enters the valve from the pump through the inlet, and exits the valve through the main outlet to satisfy the downstream demand. The recirculation outlet is connected to a secondary fluid path such as a low pressure reservoir or the pump inlet to which the fluid is directed during periods of low flow demand in the main outlet.

The main valve element senses the rate of flow between the valve inlet and main outlet. During periods of normal downstream demand, a pressure differential across the main valve element causes the valve element to open and permit flow to the main outlet, while simultaneously causing the bypass valve element to close and prevent fluid flow to the recirculation outlet. Conversely, during intervals of low downstream demand, the main valve element returns to a closed (seated) position, thereby opening the bypass element and permitting flow through the recirculation outlet to the secondary path. Additionally, the main valve element, when seated, serves as a check valve which prevents reverse rotation of the pump impeller when the pump is shut down.

With improved centrifugal pump designs, it has become increasingly necessary to have a greater recirculation flow. With the increasing demand for greater rates of recirculation flow, it has become necessary to protect the recirculation valve and recirculation piping from cavitation and other damage that can be caused by the more rapid turbulent flow.

Accordingly, it is an object of the present invention to provide an improved recirculation valve.

Another object is to provide a recirculation valve with a smoother performing bypass valve design.

A further object of the invention is to provide a recirculation valve wherein fluid flow through the bypass and into the bypass or recirculation piping is controlled to provide more reliable performance and protect the bypass valve and piping from damage.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention provides an improved automatic recirculation valve for protecting a centrifugal pump from damage due to overheating or hydraulic fluid instabilities. The invention comprises a valve having an inlet, a main outlet, a recirculation outlet, a main valve element responsive to flow between the inlet and main outlet, and a bypass element responsive to the main valve element for regulating the fluid flow between the inlet and the recirculation outlet. The bypass element includes a bypass bushing and bypass adapter through which the recirculation fluid flows. The bushing is designed to protect the interior of the recirculation valve from damage and the bypass adapter directs the flow of recirculation fluid into the recirculation piping with a swirling movement to prevent damage to the piping by cavitation to provide an improved recirculation valve.

BRIEF DESCRIPTION OF THE DRAWINGS

The foregoing summary, as well as the following detailed description will be better understood when read in conjunction with the figures appended hereto. For the purpose of illustrating the invention, there is shown in the drawings an embodiment which is presently preferred, it being understood, however, that this invention is not limited to the precise arrangement and instrumentalities shown.

DETAILED DESCRIPTION OF THE INVENTION

The automatic recirculation valve described herein is a modification of the automatic recirculation valve described and claimed in my prior U.S. Pat. No. 5,333,638, the description of which is incorporated herein by reference.

Figure 1:
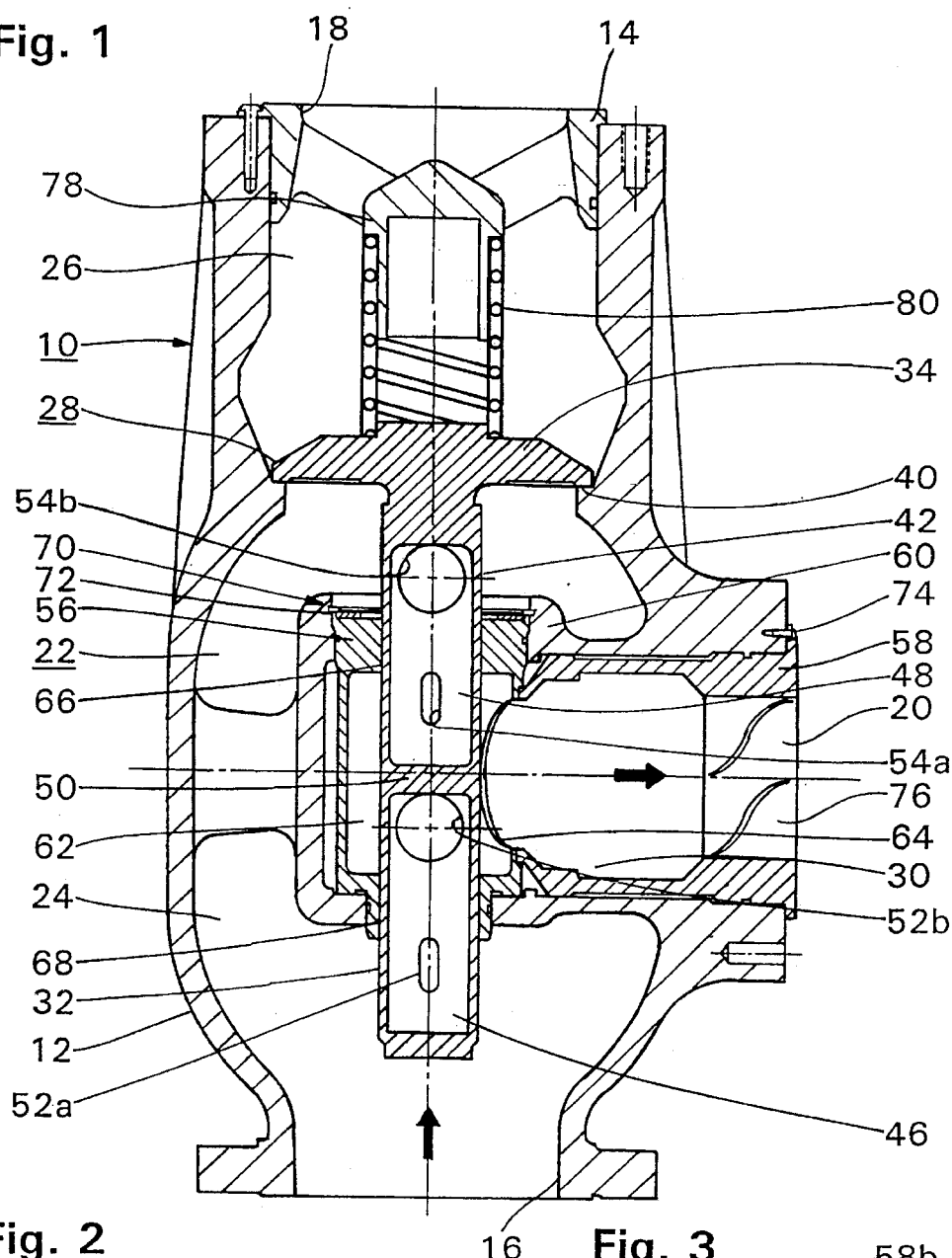
FIG. 1 is a sectional view of a recirculation valve in accordance with this invention illustrating the closed position of the main valve member and the fully open position of the bypass element.

Referring to the drawing, there is illustrated in FIG. 1 a modulating recirculation control valve 10 in accordance with the present invention comprising a main body 12 and bonnet member 14 attached to main body 12. The bonnet member 14 can be attached to main body 12 by any suitable means, including threaded, screwed or bolted connection. The recirculation valve 10 has an inlet 16 which is connected to the downstream side of a centrifugal pump for receiving pumped fluid, a main outlet 18 wherethrough the fluid flows to the source of the downstream pump demand, and recirculation outlet 20 wherethrough pumped fluid is directed during periods of low downstream pump demand to a low pressure reservoir or returned to the pump inlet. Flanged connections are shown for the inlet and two outlets, however, any suitable pipe connection means may be used.

Extending between inlet 16 and main outlet 18 is a main flow passage 22 comprising a lower main flow passage 24 and an upper flow passage 26 divided by main valve element 28, described below. Bypass passage 30 extends from lower passage 24 to recirculation outlet 20 and is separated from lower flow passage 24 by bypass valve element 32, described below.

Regulating the recirculation flow are the internal valve elements including the main valve element 28 positioned within fluid passage 22 and moving responsively to the fluid flow therethrough, and bypass element 32 positioned to control fluid flow between lower main flow passage 24 and recirculation passage 30 in response to the movement of main valve element 28.

The main valve element 28 comprises a circular valve disc 34 with a lower sealing face for sealing the main valve element 28 against a valve seat 40 when the main valve element is in the fully closed position. Seat 40, as illustrated, is formed as part of main valve body 12, but may also comprise a separate replaceable seat element.

Attached to and moving with main valve element 28 is bypass valve element 32 comprising a cylindrical shaft 42. Shaft 42 is interposed within the lower main passageway 24 along the vertical center of valve 10. Shaft 42 comprises two hollow chambers, a lower shaft chamber 46 and an upper shaft chamber 48 separated by a wall 50 and sealed at its opposite ends. Lower shaft chamber 46 communicates with the lower main passageway 24 through slotted orifices 52a, and with recirculation passageway 30 through circular aperture 52b. Similarly, though inversely, upper shaft chamber 48 communicates with the lower main passageway 24 through circular aperture 54b, and with the recirculation passageway through slotted orifices 54a.

In accordance with the present invention, a shaft guide bushing 56 and a bypass adapter 58, respectively, control and direct the flow of fluid passing through the bypass valve into the recirculation conduit (not shown), which conduit would have an internal diameter concentric with and substantially equal to or larger in diameter to the bypass outlet 20 of the bypass adapter 58.

As shown in FIG. 1, the shaft guide bushing 56 is secured within a central hub 60 formed integrally with the valve body. The shaft guide bushing is of generally cylindrical shape with a central bypass fluid chamber 62 surrounding the bypass valve shaft 42 and an outlet opening 64 facing the bypass outlet 20. Upper and lower bushing surfaces 66 and 68, respectively, closely surround the bypass valve shaft 42 to direct movement of the main valve and bypass valve. A retaining ring 70 and spring washer 72 secure the shaft guide bushing 56 to the hub 60.

The bypass adapter 58 is secured within the bypass outlet by a retaining screw 74. This adapter 58 is also of hollow cylindrical shape with its inner surface forming part of the bypass passage 30. The inner end of the adapter 58 may be contoured to closely surround and seal against the guide bushing outlet 64. At the forward end of the adapter there is provided a series of helical vanes 76 to impart a rapid swirling movement to the bypass fluid exiting the bypass outlet 20. This swirling movement of the fluid protects the downstream piping from cavitation and erosion by preventing any entrained gas bubbles from imploding against the inner surface of the downstream piping. Preferably, the shaft guide bushing 56 and bypass adapter 58 are formed from stainless steel such as ASTM A564 Type 630 and ASTM A276 Type 316, respectively, to resist damage by the recirculation fluid flow.

Figure 2:
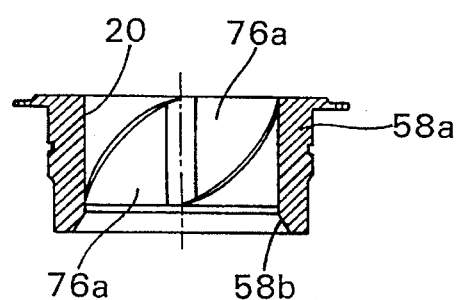
FIG. 2 is a transverse sectional view of a modified form of bypass adapter of the present invention.
Figure 3:
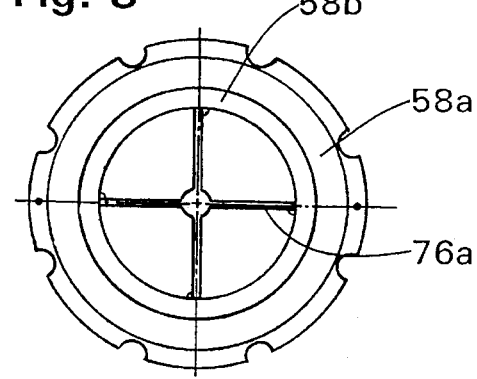
FIG. 3 is a plan view of the bypass adapter illustrating the swirl vanes mounted in the bypass adapter.

FIGS. 2 and 3 illustrate a modified form of a bypass adapter 58a. This adapter terminates in the valve body short of the bushing insert 56 with a flared inlet 58b to receive the recirculation fluid. Vanes 76a are formed as a separate insert. In the embodiment shown, the insert includes four vanes, each of which terminate diametrically of the bushing insert at both the inner and outer ends of the insert. Each vane is helical with the edge of the vane blade at the exit of the insert advanced 90 degrees from the edge of the vane blade at the entrance of the insert. This imparts a rapid swirling movement to the recirculation fluid passing over the vanes. The vanes are secured within the insert, for example, by tack welding at the leading and trailing edge of each vane blade.

Vertical movement of bypass element 32 is controlled by the movement of main valve element 28 to which bypass element 32 is attached. Main valve element 28 can move between its fully closed position whereby the sealing face seats against valve seat 40, and its fully open position whereby top face 36 approaches or abuts against the bonnet hub 78 interposed in the upper main passageway 26 and attached to bonnet piece 14. As shown, bonnet hub 76 is formed as part of bonnet piece 14.

Helical spring 80, connected at one end to bonnet hub 76 and at the other end to main valve element 28, is in compression to urge main valve element 28 into the fully closed position.

The characteristics and performance of valve 10 can be altered to meet the particular requirements of each application. An annular valve insert (not shown) can be added to alter the spacing between the valve disc 34 and the internal wall of valve body 12 through which the fluid flows. This controls the movement of valve element 28 relative to the rate of fluid flow past the valve element 28. The insert can be shaped for particular requirements and can be made out of any suitable material such as sheet metal. The valve 10 can also be sized for a particular fluid pressure and/or flow rate in the recirculation passageway 30 by modifying the diameter of the outlet of the bypass adapter 58.

While a particular embodiment of the present invention is disclosed herein, it is not intended to limit the invention to such disclosure, and changes and modifications may be incorporated and embodied within the scope of the following claims.

What is claimed is:

1. An automatic recirculation valve for sensing flow of fluid therethrough and providing for flow of recirculation fluid, comprising:

a valve body and an integral central hub within the valve body;

a bypass passage within said valve body through which recirculation fluid passes;

an inlet in said valve body;

a main outlet in said valve body;

a recirculation outlet in said valve body;

a main valve element responsive to flow of fluid between said inlet and said main outlet;

a bypass valve element responsive to movement of said main valve element for regulating the flow of recirculation fluid between said inlet and said recirculation outlet;

a bypass valve stem through which the recirculation fluid flows into said bypass passage, said bypass valve stem passing through said hub;

a shaft guide bushing secured within said central hub surrounding said valve stem;

a chamber within said shaft guide bushing into which recirculation fluid flows from said valve stem;

said shaft guide bushing chamber having an outlet opening;

a hollow generally cylindrical bypass adapter having first and second open end portions with fluid communication therebetween, said bypass adapter secured within said recirculation outlet and surrounds and is sealed against said guide bushing outlet, the first end portion of said adapter in fluid communication with said shaft guide bushing outlet opening and the second end portion thereof at said recirculation outlet; and vanes provided within the second end portion of said bypass adapted to impart a swirling movement to the recirculation fluid as it leaves the recirculation outlet.

2. An automatic recirculation valve according to claim 1 wherein said vanes are helical.

3. An automatic recirculation valve according to claim 1 wherein said shaft guide bushing has opposite end portions facing toward said inlet and said main outlet, respectively; and wall members at said opposite end portions preventing fluid flow into and out of said shaft guide bushing chamber through said opposite end portions.

4. An automatic recirculation valve according to claim 3 wherein said opposite wall members provide bushing surfaces surrounding said bypass valve shaft to direct movement of said bypass valve.

5. An automatic recirculation valve according to claim 4 wherein vanes are provided within the second end portion of said bypass adapter to impart a swirling movement to the recirculation fluid as it leaves the recirculation outlet.

6. An automatic recirculation valve according to claim 5 wherein said vanes are helical.

* * * * *